United States Patent
Ho et al.

(10) Patent No.: US 12,394,580 B2
(45) Date of Patent: Aug. 19, 2025

(54) LUMINOUS KEYBOARD AND ILLUMINANT BOARD THEREOF

(71) Applicant: Darfon Electronics Corp., Taoyuan (TW)

(72) Inventors: Hsin-Cheng Ho, Taoyuan (TW); Heng-Yi Huang, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 339 days.

(21) Appl. No.: 18/130,462

(22) Filed: Apr. 4, 2023

(65) Prior Publication Data

US 2023/0326692 A1 Oct. 12, 2023

(30) Foreign Application Priority Data

Apr. 8, 2022 (TW) ................................. 111113486
Mar. 16, 2023 (TW) ................................. 112109776

(51) Int. Cl.
*H01H 13/83* (2006.01)

(52) U.S. Cl.
CPC ......... *H01H 13/83* (2013.01); *H01H 2219/06* (2013.01); *H01H 2219/062* (2013.01)

(58) Field of Classification Search
CPC ........ H01H 13/00; H01H 13/50; H01H 13/70; H01H 13/7006; H01H 13/702;
(Continued)

(56) References Cited

U.S. PATENT DOCUMENTS 6,860,612 B2   3/2005   Chiang et al.
6,964,531 B2   11/2005  Lin et al.
(Continued)

FOREIGN PATENT DOCUMENTS

CN   100482028 C   4/2009
CN   101577260 A   11/2009
(Continued)

OTHER PUBLICATIONS

Office action of counterpart application (112109776) by Taiwan IP Office on Oct. 20, 2023.
(Continued)

*Primary Examiner* — Anthony R Jimenez

(57) ABSTRACT

An illuminant board includes a substrate, a circuit layer, a light guide plate, a plurality of microstructures and at least one illuminant. The substrate defines at least one key projection. The circuit layer is disposed on the substrate. The circuit layer includes at least one high-potential main conductive wire and at least one low-potential main conductive wire. The light guide plate is disposed opposite to the circuit layer. The microstructures are located between the light guide plate and the substrate. The illuminant is coupled to the circuit layer. The illuminant provides a luminous light inletting into the light guide plate, and a path of the luminous light is guided by the microstructures. The high-potential main conductive wire and/or the low-potential main conductive wire extend and pass through the key projection. Orthographic projections of the microstructures are located between the high-potential main conductive wire and the low-potential main conductive wire.

17 Claims, 5 Drawing Sheets

(58) Field of Classification Search
CPC .. H01H 13/83; H01H 2219/06; H01H 13/062; H01H 2203/052; H01H 3/12; H01H 9/00; H01H 9/16; H01H 9/161; H01H 9/18; H01H 9/181; H01H 9/182; H01H 9/185; H01H 2003/12; H01H 2009/16; H01H 2009/161; H01H 2009/164; H01H 2009/18; H01H 2009/182; H01H 2009/186; H01H 2013/00; H01H 2013/50; H01H 2013/52
USPC .......................................................... 200/314
See application file for complete search history.

(56) References Cited

U.S. PATENT DOCUMENTS

| | | | |
|---|---|---|---|
| 8,383,971 | B2 | 2/2013 | Liu |
| 8,742,432 | B2 | 6/2014 | Sato et al. |
| 9,214,301 | B2 | 12/2015 | Chen |
| 9,633,803 | B2 | 4/2017 | Wang |
| 11,443,907 | B2 | 9/2022 | Ho et al. |
| 2010/0038226 | A1 | 2/2010 | Lin |
| 2010/0182529 | A1 | 7/2010 | Nakanishi |
| 2011/0042124 | A1 | 2/2011 | Matsui et al. |
| 2011/0186340 | A1 | 8/2011 | Kuramoto et al. |
| 2011/0309379 | A1 | 12/2011 | Shibusawa et al. |
| 2012/0092260 | A1 | 4/2012 | Liu |
| 2014/0168935 | A1 | 6/2014 | Chen |
| 2016/0042891 | A1 | 2/2016 | Ligtenberg et al. |
| 2016/0284493 | A1 | 9/2016 | Chen |
| 2017/0328524 | A1 | 11/2017 | Peterson et al. |
| 2018/0106956 | A1 | 4/2018 | Wang |
| 2018/0321542 | A1 | 11/2018 | Onishi |
| 2019/0371537 | A1 | 12/2019 | Huang et al. |
| 2019/0371538 | A1* | 12/2019 | Huang ................. G02B 6/0068 |

FOREIGN PATENT DOCUMENTS

| | | |
|---|---|---|
| CN | 201440242 U | 4/2010 |
| CN | 201903837 U | 7/2011 |
| CN | 102625578 A | 8/2012 |
| CN | 105470378 A | 4/2016 |
| CN | 109114457 A | 1/2019 |
| CN | 109243896 A | 1/2019 |
| CN | 210129448 U | 3/2020 |
| CN | 212783186 U | 3/2021 |
| CN | 113972084 A | 1/2022 |
| CN | 114068221 A | 2/2022 |
| TW | M478318 U | 5/2014 |
| TW | M546017 U | 7/2017 |
| TW | M547130 U | 8/2017 |
| TW | 202004809 A | 1/2020 |
| TW | 202004810 A | 1/2020 |
| TW | I685009 B | 2/2020 |
| TW | 202205328 A | 2/2022 |
| TW | 202206979 A | 2/2022 |

OTHER PUBLICATIONS

Office action of counterpart application (111143775) by Taiwan IP Office on Oct. 20, 2023.

* cited by examiner

LUMINOUS KEYBOARD AND ILLUMINANT BOARD THEREOF

This application claims the benefit of Taiwan application Serial No. 111113486, filed Apr. 8, 2022 and Taiwan application Serial No. 112109776, filed Mar. 16, 2023, the subject matters of which are incorporated herein by reference.

BACKGROUND OF THE INVENTION

Field of the Invention

The invention relates in general to a keyboard and a circuit board thereof, and more particularly to a luminous keyboard and an illuminant board thereof.

Description of the Related Art

As modern people are demanding higher and higher standards of electronic devices, the electronic devices not only need to meet basic functions but also need to provide other added values, such as comforts and aesthetics. For instance, when operating the keyboard, the user would not be contented with the basic typing function only. Instead, the user also expects some other added values of the keyboard. For instance, it would be even better if the keyboard can be equipped with a luminous function so that the user can operate the keyboard even in poor lighting conditions. Therefore, it has become a prominent task for the industries to provide a luminous keyboard that better suits the user's needs.

SUMMARY OF THE INVENTION

The present invention is directed to a luminous keyboard and an illuminant board thereof, wherein the luminous keyboard and the illuminant board thereof have excellent lighting effects.

According to one embodiment of the present invention, an illuminant board is provided. The illuminant board includes a substrate, a circuit layer, a light guide plate, a plurality of microstructures and at least one illuminant. The substrate defines at least one key projection. The circuit layer is disposed on the substrate. The circuit layer includes at least one high-potential main conductive wire and at least one low-potential main conductive wire. The light guide plate is disposed opposite to the circuit layer. The microstructures are located between the light guide plate and the substrate. The illuminant is coupled to the circuit layer. The illuminant provides a luminous light inletting into the light guide plate, and a path of the luminous light is guided by the microstructures. The at least one high-potential main conductive wire and/or the at least one low-potential main conductive wire extend and pass through the at least one key projection. Orthographic projections of the microstructures are located between the at least one high-potential main conductive wire and the at least one low-potential main conductive wire.

According to one embodiment of the present invention, a luminous keyboard is provided. The luminous keyboard includes a bottom plate, a plurality of keycaps and an illuminant board. The bottom plate has at least one light hole. The keycaps are located above the bottom plate and move towards or away from the bottom plate when being pressed or released by an external force. The illuminant board is disposed opposite to the bottom plate. The illuminant board includes a substrate, a circuit layer, a light guide plate, a plurality of microstructures and at least one illuminant. The substrate defines at least one key projection. The circuit layer is disposed on the substrate. The circuit layer includes at least one high-potential main conductive wire and at least one low-potential main conductive wire. The light guide plate is disposed opposite to the circuit layer. The microstructures are located between the light guide plate and the substrate. The illuminant is coupled to the circuit layer. The illuminant provides a luminous light inletting into the light guide plate, and a path of the luminous light is guided by the microstructures. The at least one high-potential main conductive wire and/or the at least one low-potential main conductive wire extend and pass through the at least one key projection. An orthographic projection of the at least one light hole on the bottom plate does not overlap the at least one high-potential main conductive wire or at least one low-potential main conductive wire passing through the at least one key projection.

According to one embodiment of the present invention, another illuminant board is provided. The illuminant board includes a light-shielding layer, a substrate, a circuit layer, a light guide plate, a plurality of microstructures and at least one illuminant. The light-shielding layer has a light-transmissive part. The substrate defines at least one key projection. The circuit layer is disposed on the substrate. The circuit layer includes at least one high-potential main conductive wire and at least one low-potential main conductive wire. The light guide plate is disposed opposite to the circuit layer. The microstructures are located between the light guide plate and the substrate. The illuminant is coupled to the circuit layer. The illuminant provides a luminous light inletting into the light guide plate, and a path of the luminous light is guided by the microstructures. The at least one high-potential main conductive wire and/or the at least one low-potential main conductive wire extend and pass through the at least one key projection. An orthographic projection of the at least one light-transmissive part of the light-shielding layer is located between the at least one high-potential main conductive wire and the at least one low-potential main conductive wire.

According to one embodiment of the present invention, an alternate illuminant board is provided. The illuminant board includes a substrate, a circuit layer, at least one illuminant and a plurality of microstructures. The substrate defines at least one key projection. The circuit layer is disposed on the substrate. The circuit layer includes at least one high-potential main conductive wire and at least one low-potential main conductive wire. The illuminant is coupled to the circuit layer. The illuminant provides a luminous light. The microstructures are located on the substrate. Orthographic projections of the microstructures at least partially surround the illuminant. The at least one high-potential main conductive wire and/or the at least one low-potential main conductive wire extend and pass through the at least one key projection. The orthographic projections of the microstructures are located between the at least one high-potential main conductive wire and the at least one low-potential main conductive wire.

According to one embodiment of the present invention, another alternate illuminant board is provided. The illuminant board includes a substrate, a circuit layer, a light guide plate, a plurality of microstructures and at least one illuminant. The substrate defines at least one key projection. The circuit layer is disposed on the substrate. The circuit layer includes at least one high-potential main conductive wire and at least one low-potential main conductive wire. The light guide plate is disposed opposite to the circuit layer. The light guide plate has a light guide plate hole. The microstructures are located between the light guide plate and the substrate. The illuminant is coupled to the circuit layer. The at least one illuminant is located in the light guide plate hole and provides a luminous light inletting into the light guide plate, and a path of the luminous light is guided by the microstructures. The at least one high-potential main conductive wire and/or the at least one low-potential main conductive wire extend and pass through the at least one key projection. An orthographic projection of the light guide plate hole is located between the at least one high-potential main conductive wire and the at least one low-potential main conductive wire.

According to one embodiment of the present invention, another alternate illuminant board is provided. The illuminant board includes a substrate, a circuit layer, a plurality of microstructures and at least one illuminant. The substrate defines at least one key projection. The circuit layer is disposed on the substrate. The circuit layer includes at least one high-potential main conductive wire and at least one low-potential main conductive wire. The microstructures are located on the substrate. The illuminant is coupled to the circuit layer. The illuminant provides a luminous light. The at least one high-potential main conductive wire and/or the at least one low-potential main conductive wire extend and pass through the at least one key projection. Orthographic projections of the microstructures are located between the at least one high-potential main conductive wire and the at least one low-potential main conductive wire.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 2 is a cross-sectional view along a cross-sectional line A-A in. FIG. 1 according to an embodiment of the present invention;

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. It can be understood that in terms of structure, some elements can be added, removed, integrated and/or adjusted as long as the spirit of the invention is not breached. Moreover, elements described in singular form can be adapted to plural form. For the accompanying drawings to be illustrated more clearly, elements of the accompanying drawings may not reflect actual sizes scales, and some elements and/or element designations. It can be expected that wherever conditions allow, elements and their characteristics disclosed in one embodiment can be incorporated in another embodiment regardless of whether relevant descriptions are provided or not.

Figure 1:
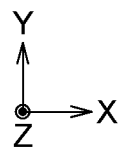
FIG. 1 is a top view of a keycap of a luminous keyboard according to an embodiment of the present invention.
Figure 1:
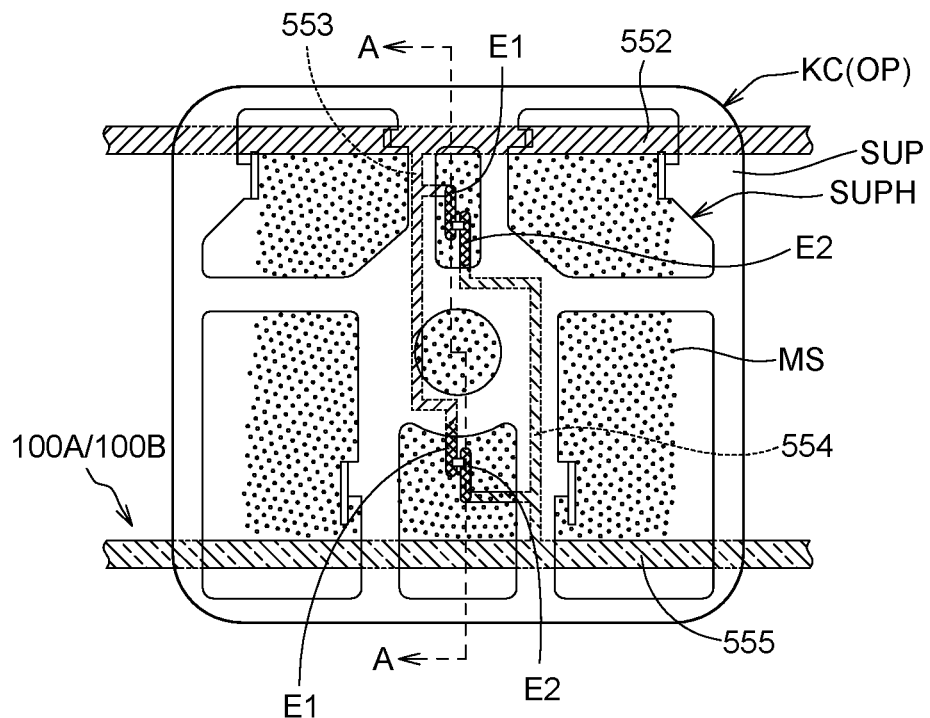
Figure 2:
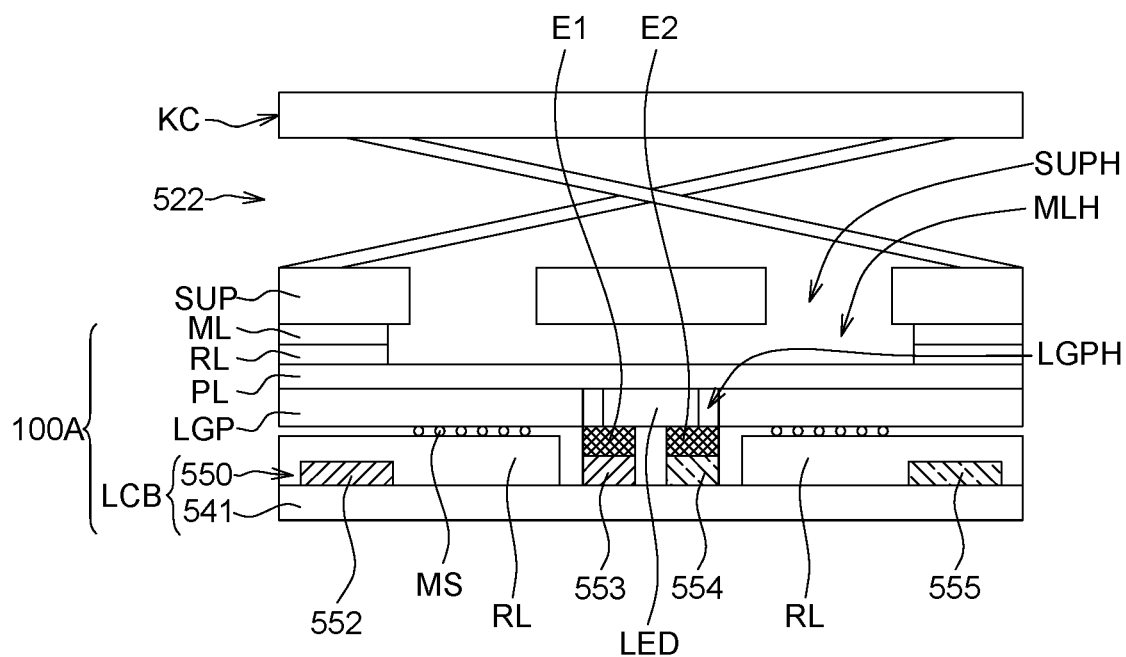

FIG. 1 is a top view of a keycap KC of a luminous keyboard 10 according to an embodiment of the present invention. FIG. 2 is a cross-sectional view along a cross-sectional line A-A in FIG. 1 according to an embodiment 10A of the present invention with a top light illuminant board 100A.

Referring to both FIGS. 1 and 2, the luminous keyboard 10 includes a bottom plate SUP, a plurality of keycaps KC and an illuminant board 100A. The bottom plate SUP and the keycaps KC are stacked above the illuminant board 100A along the Z-axis direction. The illuminant board 100A is disposed under a plurality of keycaps KC. The keycaps KC move towards or away from the illuminant board 100A when being pressed or released by an external force. The illuminant board 100A, the bottom plate SUP and the keycaps KC together form a luminous keyboard 10. It can be understood that the luminous keyboard 10 can further include other elements. For instance, a transparent thin-film circuit board can be disposed above or under the bottom plate SUP. The thin-film circuit board has a plurality of switches corresponding to respective keycaps KC. The switches can be triggered to generate signals when the corresponding keycaps KC are pressed. For the convenience of elaboration, the thin-film circuit board is not illustrated in the accompanying drawings.

As shown in FIG. 2, the illuminant board 100A includes a substrate 541, a circuit layer 550, a selective light guide plate LGP, a plurality of microstructures MS and at least one illuminant LED. It should be understood that FIGS. 1 and 2 only exemplarily illustrate single keycap, such as the corresponding keycap of the letter A, but the present invention is not limited thereto. The substrate 541 defines at least one key projection OP, that is, the key projection OP represents the projection area of the contour of the keycap KC on the illuminant board 100A (such as the projection area along the Z-axis direction).

The substrate 541 can be any suitable substrate. According to some embodiments, the substrate is a substrate that can be used in a printing process. In some embodiments, the substrate is a flexible substrate permeable or impermeable to the light. For instance, the substrate 541 can be formed of polyethylene terephthalate (PET) or a flexible printed circuit board.

As shown in FIG. 2, the circuit layer 550 is disposed on the substrate 541. The circuit layer 550 and the substrate 541 together form a circuit board LCB. The circuit layer 550 includes at least one high-potential main conductive wire 552 and at least one high-potential secondary conductive wire 553. A plurality of wires are electrically coupled to a plurality of electrode portions of corresponding wires. In some embodiments, the circuit layer 550 can be formed of a material such as copper paste, nickel paste, silver paste, silver plating, tin plating, nickel plating, gold plating or other suitable materials.

As shown in FIGS. 1 and 2, the circuit layer 550 can include a plurality of wires and a plurality of electrode portions electrically coupled to corresponding wires. The wires include the at least one high-potential main conductive wire 552, the at least one high-potential secondary conductive wire 553. The wires can further include at least one low-potential main conductive wire 555 and at least one low-potential secondary conductive wire 554. The electrode portion includes at least one pair of electrode portions E1 and E2. In the present embodiment, the diameter of the high-potential main conductive wire 552 is greater than the diameter of the high-potential secondary conductive wire 553, and the diameter of the low-potential main conductive wire 555 is greater than the diameter of the low-potential secondary conductive wire 554, but the present invention is not limited thereto. The high-potential main conductive wire 552 is connected to the high-potential secondary conductive wire 553, which is connected to electrode portion E1. The high-potential main conductive wire 552, the high-potential secondary conductive wire 553 and the electrode portion E1 are electrically connected to each other. The low-potential main conductive wire 555 is connected to the low-potential secondary conductive wire 554, which is connected to the electrode portion E2. The low-potential main conductive wire 555, the low-potential secondary conductive wire 554 and the electrode portion E2 are electrically connected to each other. The high-potential main conductive wire 552 and/or the low-potential main conductive wire 555 extend and pass through at least one key projection OP, such as the two ends of the key projection OP, along the X-axis direction. In some embodiments, the high-potential main conductive wire 552 and/or the low-potential main conductive wire 555 can extend and pass through a plurality of key projection OP along the X-axis direction. The high-potential secondary conductive wire 553 and the low-potential secondary conductive wire 554 respectively can extend from the high-potential main conductive wire 552 and the low-potential main conductive wire 555 along the Y-axis direction to the corresponding electrode portions E1 and E2 along the X-axis direction.

As shown in FIGS. 1 and 2, the light guide plate LGP is disposed opposite to the circuit layer 550. The light guide plate LGP can have a light guide plate hole LGPH. The illuminant LED can be located in the light guide plate hole LGPH. A plurality of microstructures MS are located between the light guide plate LGP and the substrate 541. The illuminant LED is coupled to the circuit layer 550. Specifically, the illuminant LED can be coupled to at least one pair of electrode portions (such as electrode portions E1 and E2) within the range of the key projection OP. The high-potential secondary conductive wire 553 is electrically connected between the high-potential main conductive wire 552 and the illuminant LED; the low-potential secondary conductive wire 554 is electrically connected between the low-potential main conductive wire 555 and the illuminant LED. The illuminant LED provides a luminous light. Specifically, the illuminant LED can provide a luminous light inletting into the light guide plate LGP, and the path of the luminous light is guided by the microstructures MS. In the present embodiment, the light guide plate LGP is disposed above the circuit layer 550 (that is, the light guide plate LGP is disposed on one side of the circuit layer 550 closer to the keycap KC); the illuminant LED at least emits a light in an upward direction (for instance, the light outputting surface of the illuminant LED can face upward), but the present invention is not limited thereto. The microstructures MS can be a plurality of scattering dots made of highly reflective inks (such as white paint) or a plurality of concave-convex optical micro-dot structures formed on the bottom surface of the light guide plate LGP.

As shown in FIG. 1, the orthographic projections of the microstructures MS are located between the high-potential main conductive wire 552 and the low-potential main conductive wire 555. In other words, the orthographic projections of the microstructures MS do not overlap the high-potential main conductive wire 552 and the low-potential main conductive wire 555. Thus, the luminous light guided by the microstructures MS will not be shielded by the high-potential main conductive wire 552 or the low-potential main conductive wire 555. In comparison to a comparison example where the orthographic projections of the microstructures of the illuminant board overlap the high-potential main conductive wire or the low-potential main conductive wire passing through at least one key projection, the orthographic projections of the microstructures MS of the illuminant board 10 of the present invention do not overlap the high-potential main conductive wire 552 or the low-potential main conductive wire 555 passing through at least one key projection OP, so that the luminous light will not be shielded by the high-potential main conductive wire 552 or the low-potential main conductive wire 555, the lighting efficiency can be increased and a better optical effect can be achieved.

In some embodiments, the orthographic projections of the microstructures MS at least partially surround the illuminant LED. In some embodiments, a first overlapped area and a first non-overlapped area are formed between the orthographic projections of the microstructures MS and the orthographic projection of the high-potential secondary conductive wire 553, and the first non-overlapped area is greater than the first overlapped area; a second overlapped area and a second non-overlapped area are formed between the orthographic projections of the microstructures MS and the orthographic projection of the low-potential secondary conductive wire 554, and the second non-overlapped area is greater than the second overlapped area. That is, to avoid the luminous light being shielded by the high-potential secondary conductive wire 553 or the low-potential secondary conductive wire 554, the high-potential secondary conductive wire 553 or the low-potential secondary conductive wire 554 would better not overlap the orthographic projections of the microstructures MS, so that a better optical effect can be achieved.

As shown in FIGS. 1 and 2, the bottom plate SUP has at least one light hole SUPH, keycaps KC located above the bottom plate SUP, wherein, the orthographic projection of the light hole SUPH on one part of the bottom plate SUP overlaps the high-potential main conductive wire 552 or the low-potential main conductive wire 555 passing through the key projection OP, and the orthographic projection of the light hole SUPH on the other part of the bottom plate SUP does not overlap the high-potential main conductive wire 552 or the low-potential main conductive wire 555 passing through the key projection OP. In some embodiments, the area of the orthographic projection of the light hole SUPH not overlapping the high-potential main conductive wire 552 or the low-potential main conductive wire 555 is greater than the area of the orthographic projection of the light hole SUPH overlapping the high-potential main conductive wire 552 or the low-potential main conductive wire 555. That is, the area of the orthographic projection on the bottom plate SUP overlapping the high-potential main conductive wire 552 or the low-potential main conductive wire 555 is increased, and the area of the orthographic projection of the light hole SUPH overlapping the high-potential main conductive wire 552 or the low-potential main conductive wire 555 is reduced, so that the high-potential main conductive wire 552 or the low-potential main conductive wire 555 is less likely to shield the light. In some embodiments, the orthographic projection of the light hole SUPH on the bottom plate SUP does not overlap the high-potential main conductive wire 552 or the low-potential main conductive wire 555 passing through the key projection OP, so that a better optical effect can be achieved.

As shown in FIG. 2, the illuminant board 100A further includes a light-shielding layer ML and a protection layer PL, wherein the light-shielding layer ML and the protection layer PL are disposed on the same side of the light guide plate LGP, such as the upper side of the light guide plate LGP (that is, the side closer to the bottom plate SUP and the keycap KC). In the present embodiment, the light-shielding layer ML can be located above the light guide plate LGP, that is, the surface of the protection layer PL. Besides, the light-shielding layer ML has a light-transmissive part MLH. The keycap KC can be located above the light-shielding layer. In some embodiments, the orthographic projection of the light-transmissive part MLH of the light-shielding layer ML is located between the high-potential main conductive wire 552 and the low-potential main conductive wire 555. In other words, the orthographic projection of the light-transmissive part MLH does not overlap at least one high-potential main conductive wire 552 and at least one low-potential main conductive wire 555 passing through at least one key projection OP, so that the high-potential main conductive wire 552 or the low-potential main conductive wire 555 is less likely to shield the light. In some embodiments, one part of the orthographic projection of the light-transmissive part MLH of the light-shielding layer ML overlaps at least one high-potential main conductive wire 552 or at least one low-potential main conductive wire 555 passing through at least one key projection OP, and the other part of the orthographic projection of the light-transmissive part MLH of the light-shielding layer ML does not overlap at least one high-potential main conductive wire 552 or at least one low-potential main conductive wire 555 passing through at least one key projection OP. In some embodiments, the orthographic projection of the light-transmissive part MLH of the light-shielding layer ML overlaps one of at least one high-potential main conductive wire 552 and at least one low-potential main conductive wire 555 passing through at least one key projection OP; the orthographic projection of the light-transmissive part MLH of the light-shielding layer ML does not overlap the other one of at least one high-potential main conductive wire 552 and at least one low-potential main conductive wire 555 passing through at least one key projection OP. The protection layer PL can be formed of PET, UV paste or similar material. Depending on actual needs, the reflective layer RL and the light-shielding layer ML can be disposed on the inner or outer surface of the protection layer PL. The reflective layer RL and the light-shielding layer ML according to each embodiment of the present invention can be independent sheets with high reflectivity or low transmittance. However, the reflective layer RL and the light-shielding layer ML can also be sheets coated with high reflectivity ink (such as white or silver ink) and opaque ink (such as black ink) and selectively printed on the bottom surface of the bottom plate SUP or the top or bottom surface of the protection layer PL or directly printed on the top or bottom surface of the light guide plate LGP to provide reflective and shading functions. In the present embodiment, the illuminant board 100A further includes a light-shielding layer ML and a reflective layer RL disposed above the light guide plate LGP. In other embodiments, the light-shielding layer ML is disposed above the light guide plate LGP, and the reflective layer RL is dispensed with.

As shown in FIG. 2, the illuminant board 100A further includes another reflective layer RL whose orthographic projection overlaps the microstructures MS, and the reflective layer RL is located between the microstructures MS and the substrate 541.

Figure 3:
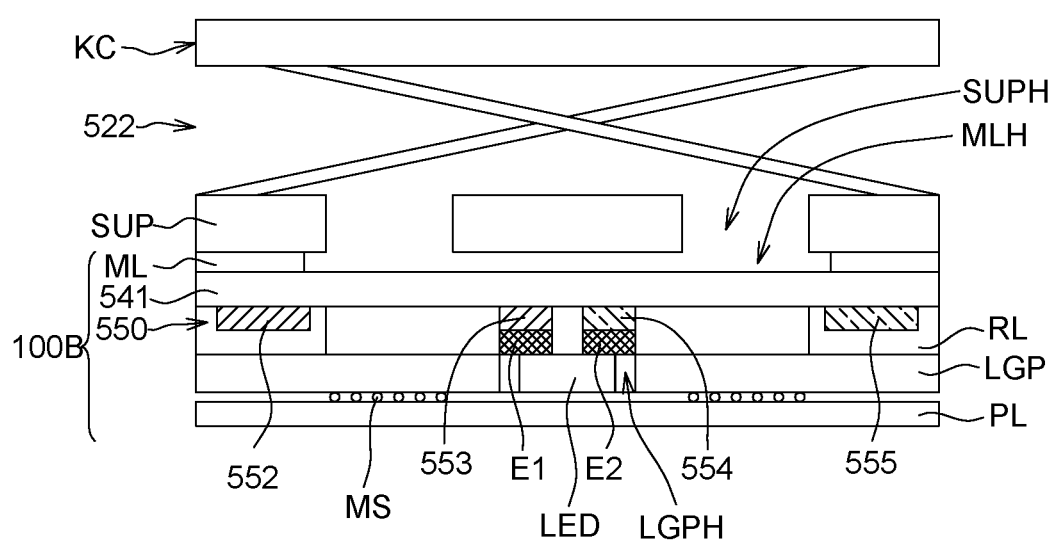
FIG. 3 is a cross-sectional view along a cross-sectional line A-A in FIG. 1 according to another embodiment of the present invention.

FIG. 3 is a cross-sectional view along a cross-sectional line A-A in FIG. 1 according to another embodiment 10B of the present invention with a bottom light illuminant board 100B. The stacking sequence of layers on the illuminant board 100B is different from that on the illuminant board 100A. Elements of the luminous keyboard 10 of embodiment 10B identical or similar to that of the luminous keyboard 10 of embodiment 10A are denoted by identical or similar designations, and the similarities are not repeated.

Referring to both FIGS. 1 and 3, the luminous keyboard 10 according to embodiment 10B includes a bottom plate SUP, a plurality of keycaps KC and an illuminant board 100B. The illuminant board 100B includes a substrate 541, a circuit layer 550, a selective light guide plate LGP, a plurality of microstructures MS and at least one illuminant LED. As shown in FIG. 3, the circuit layer 550 is disposed on the substrate 541; to be precisely, the circuit layer 550 is disposed under the substrate 541 (that is, the circuit layer 550 is disposed on one side of the substrate 541 farther away from the keycap KC). The light guide plate LGP is disposed under the circuit layer 550. The microstructures MS are disposed under the substrate 541. The illuminant LED at least emits a light in a downward direction (for instance, the light outputting surface of the illuminant LED can face downward). The light-shielding layer ML and the protection layer PL are disposed on different sides of the light guide plate LGP. For instance, the light-shielding layer ML is disposed on one side of the light guide plate LGP closer to the keycap KC (the top side) and is disposed on the substrate 541. The light-shielding layer ML and the circuit layer 550 are respectively disposed on two opposite sides of the substrate 541. The protection layer PL is disposed on one side of the light guide plate LGP farther away from the keycap KC (the bottom side). As shown in FIG. 3, the illuminant LED illuminates downward, and therefore the protection layer PL can be formed of a reflective material. Alternately, the reflective layer RL can be disposed on the top or bottom surface of the transparent protection layer PL; or the reflective layer RL and the light-shielding layer ML can be stacked, so that the reflective layer RL is attached on the light guide plate LGP to reflect the light directly coming from the illuminant LED and the light indirectly coming from the light guide plate LGP back to the light guide plate LGP. In the present embodiment, the illuminant board 100B further includes a light-shielding layer ML and a reflective layer RL disposed under the light guide plate LGP. In other embodiments, the reflective layer RL is disposed under the light guide plate LGP, and the light-shielding layer ML is dispensed with.

According to some embodiments, the layers stacked on the luminous keyboard 10 from top to down respectively include a layer composed of plurality of keycaps KC, a supporting structure 522, a thin-film switch layer (not shown), a bottom plate SUP and a illuminant board 100A or 100B as shown in FIGS. 2 and 3, but the present invention is not limited thereto. In the present embodiment, there are 2 illuminant LEDs disposed under the keycap KC as shown in FIG. 1. However, it should be understood that the present invention is not limited thereto, and each keycaps KC can have one or more than one illuminant LED disposed thereunder.

Figure 4:
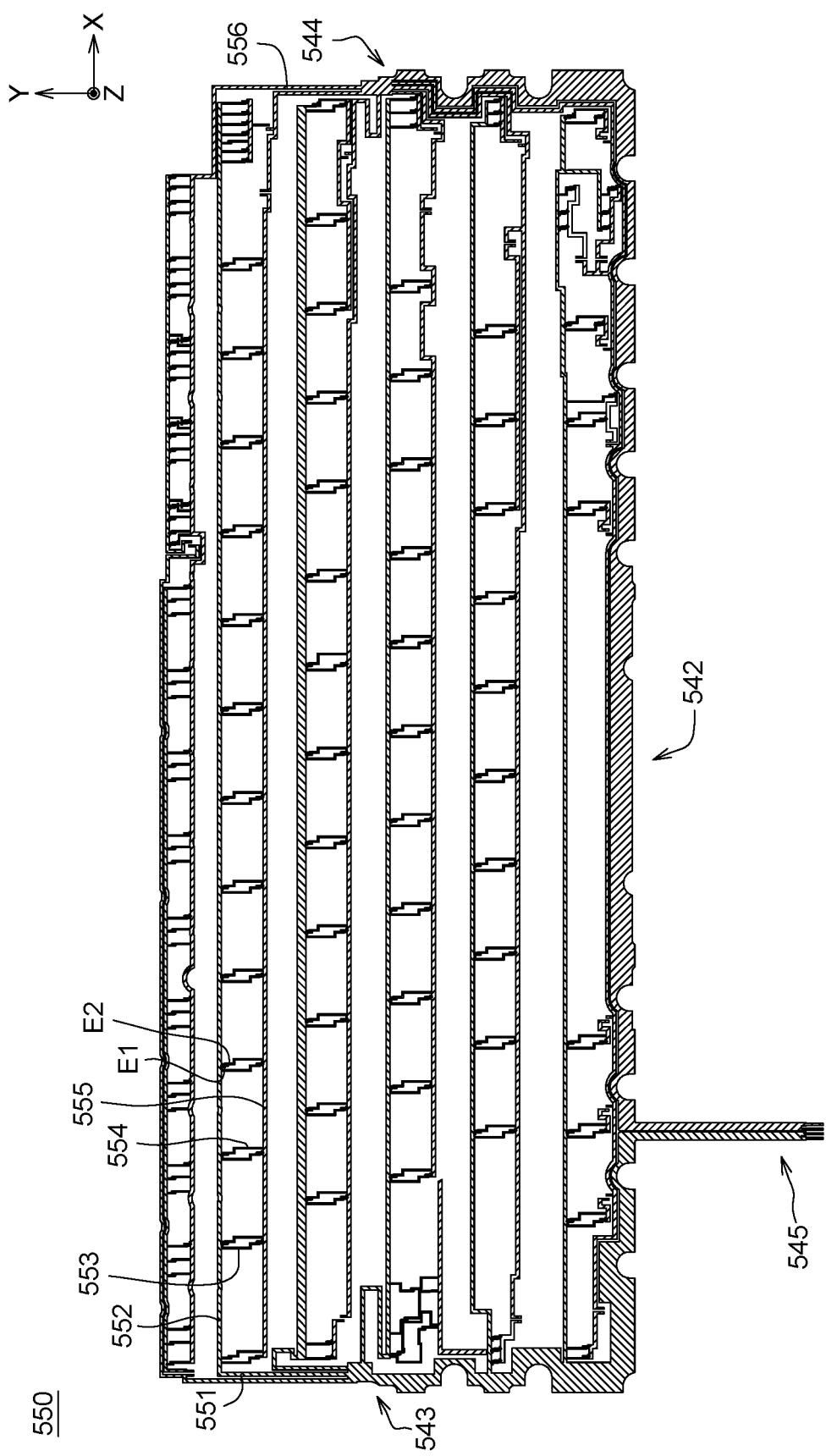
FIG. 4 is a schematic diagram of a circuit layer of an illuminant board according to an embodiment of the present invention.

FIG. 4 is a schematic diagram of a circuit layer 550 of an illuminant board (100A or 100B) according to an embodiment of the present invention.

As shown in FIG. 4, a top surface of the substrate 541 has a long side 542, a first short side 543 and a second short side 544. The first short side 543 and the second short side 544 are opposite to each other. A cable tail 545 is extended from the long side 542. The high-potential bus wire 551 is extended from the cable tail 545 to the first short side 543; the high-potential main conductive wire 552 is connected to the high-potential bus wire 551 on the first short side 543 and is extended from the first short side 543 in a direction parallel to the long side 542, that is, along the X-axis direction. The high-potential secondary conductive wire 553 is connected between the high-potential main conductive wire 552 and the corresponding electrode portion E1. The low-potential bus wire 556 is extended from the cable tail 545 to the second short side 544; the low-potential main conductive wire 555 is extended from the second short side 544 in a direction parallel to the long side 542, that is, along the X-axis direction. The low-potential secondary conductive wire 554 is connected between the low-potential main conductive wire 555 and the corresponding electrode portion E2. The illuminant LED is disposed between a high-potential electrode portion (such as electrode portion E1) of the electrode portion electrically coupled to the high-potential main conductive wire 552 and a low-potential electrode portion (such as electrode portion E2) electrically coupled to the low-potential main conductive wire. It can be understood that the arrangement of the circuit layer 550 is not limited thereto, and any arrangement would do as long as the illuminant board (such as the illuminant board 100A or 100B) allows. For instance, if the space of the illuminant board (such as the illuminant board 100A or 100B) can provide more trace flexibility, the high-potential main conductive wire 552 and the low-potential main conductive wire 555 do not have to extend in a direction parallel to the long side 542.

Figure 5:
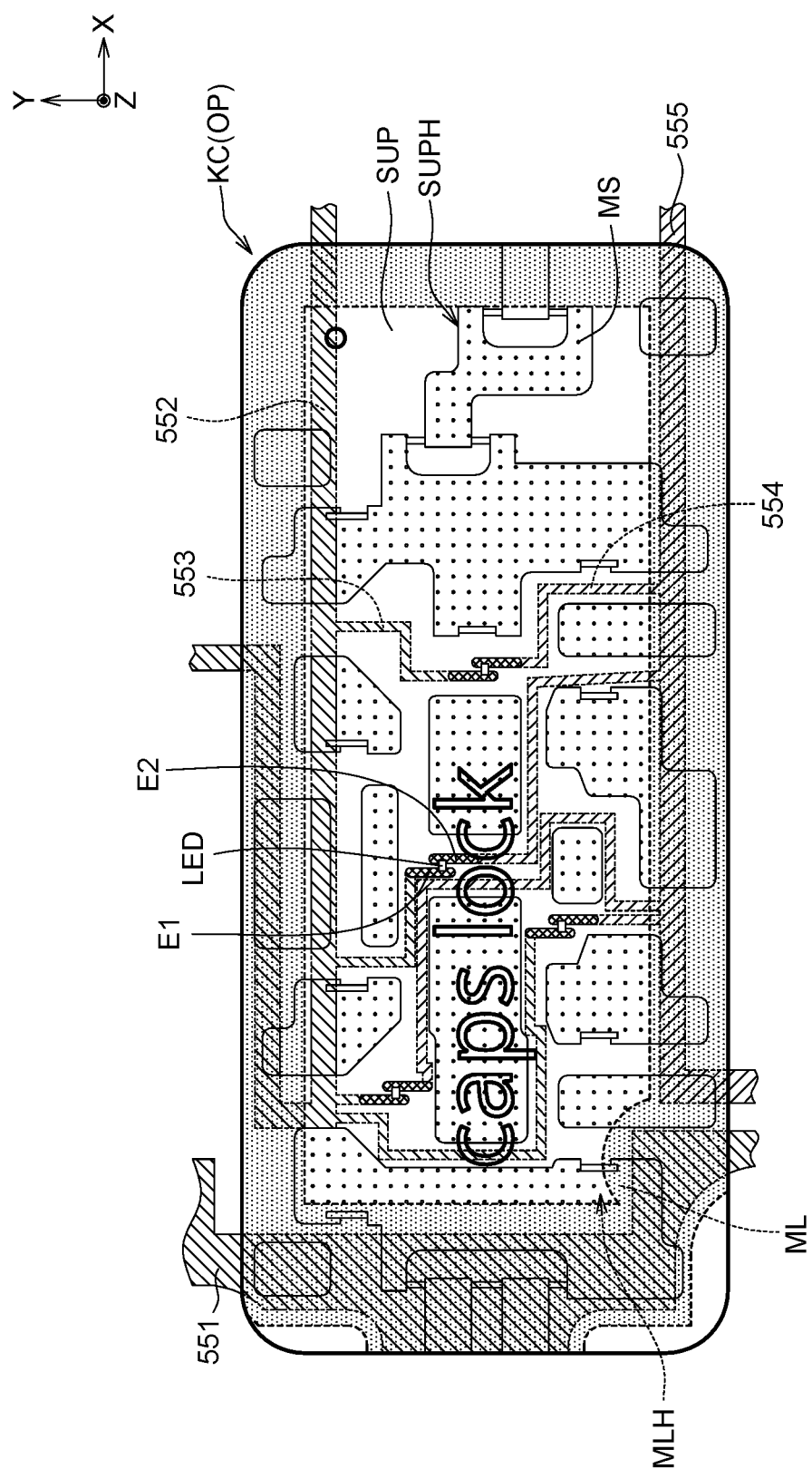
FIG. 5 is a top view of a keycap of a luminous keyboard according to another embodiment of the present invention.

FIG. 5 is a top view of a keycap KC of a luminous keyboard 10 according to another embodiment of the present invention.

Referring to FIG. 5, the keycap KC can be a multiple key such as the keycap KC with designation "caps lock". That is, the length of the keycap KC in FIG. 5 in the X-axis direction is greater than the length of the keycap KC in FIG. 1 in the X-axis direction. Within the range of the key projection OP in FIG. 5, there are 4 illuminants LED, 4 high-potential secondary conductive wires 553 connected to the high-potential main conductive wire 552, and 4 low-potential secondary conductive wires 554 connected to the low-potential main conductive wire 555. Each high-potential secondary conductive wire 553 respectively is electrically connected between the corresponding electrode portion E1 and the illuminant LED; each low-potential secondary conductive wire 554 respectively is electrically connected between the corresponding electrode portion E2 and the illuminant LED.

As shown in FIG. 5, the orthographic projection of the microstructures MS does not overlap the high-potential main conductive wire 552, the high-potential secondary conductive wire 553, the low-potential main conductive wire 555 and low-potential secondary conductive wire 554. The bottom plate SUP can have several light holes SUPH. The orthographic projection of at least one light hole SUPH on the bottom plate SUP does not overlap the high-potential main conductive wire 552 and/or the low-potential main conductive wire 555, and the orthographic projection of at least one light hole SUPH on the bottom plate SUP does not overlap the high-potential secondary conductive wire 553 and the low-potential secondary conductive wire 554. The light-shielding layer ML has a light-transmissive part MLH permeable to light. In the present embodiment, the orthographic projection of the light-transmissive part MLH of the light-shielding layer ML does not overlap the low-potential main conductive wire 555; in other embodiments, the orthographic projection of the light-transmissive part MLH of the light-shielding layer ML does not have to overlap the high-potential main conductive wire 552. It should be understood that the trace design of the high-potential main conductive wire 552, the high-potential secondary conductive wire 553, the low-potential main conductive wire 555 and low-potential secondary conductive wire 554 is not limited thereto, and any design would do as long as the high-potential main conductive wire 552, the high-potential secondary conductive wire 553, the low-potential main conductive wire 555 and the low-potential secondary conductive wire 554 are disposed under the bottom plate SUP and do not shield the light guided by the microstructures MS.

According to any of the above embodiments, through special trace design, the wires of the circuit layer of the luminous keyboard can avoid shielding the light guided by the microstructures, so that lighting efficiency can be increased and a better optical effect can be achieved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An illuminant board, comprising:
   a substrate defining at least one key projection;
   a circuit layer disposed on the substrate, wherein the circuit layer comprises at least one first main conductive wire configured to transmit a first voltage and at least one second main conductive wire configured to transmit a second voltage lower than the first voltage;
   a plurality of microstructures located on the substrate; and
   at least one illuminant coupled to the circuit layer, wherein the at least one illuminant provides a luminous light;
   wherein, the at least one first main conductive wire and/or the at least one second main conductive wire extend and pass through the at least one key projection;
   wherein, orthographic projections of the microstructures are located between the at least one first main conductive wire and the at least one second main conductive wire.

2. The illuminant board according to claim 1, wherein orthographic projections of the plurality of microstructures at least partially surround the at least one illuminant.

3. The illuminant board according to claim 1, wherein further comprising a light-shielding layer having a light-transmissive part, wherein an orthographic projection of the light-transmissive part of the light-shielding layer is located between the at least one first main conductive wire and the at least one second main conductive wire.

4. The illuminant board according to claim 1, further comprising at least one first secondary conductive wire and a second secondary conductive wire, wherein the at least one first secondary conductive wire is electrically connected between the at least one first main conductive wire and the at least one illuminant, and the at least one second secondary conductive wire is electrically connected between the at least one second main conductive wire and the at least one illuminant, wherein, a first overlapped area and a first non-overlapped area are formed between the orthographic projections of the plurality of microstructures and an orthographic projection of the at least one first secondary conductive wire, and the first non-overlapped area is greater than the first overlapped area; a second overlapped area and a second non-overlapped area are formed between the orthographic projections of the plurality of microstructures and an orthographic projection of the at least one second secondary conductive wire, and the second non-overlapped area is greater than the second overlapped area.

5. The illuminant board according to claim 1, wherein the illuminant board is disposed under a plurality of keycaps, which move towards or away from the illuminant board when being pressed or released by an external force, and the illuminant board and the plurality of keycaps together form a luminous keyboard.

6. The illuminant board according to claim 5, further comprising a bottom plate having at least one light hole, wherein the plurality of keycaps are located above the bottom plate, and an orthographic projection of the at least one light hole on the bottom plate does not overlap the at least one first main conductive wire or at least one second main conductive wire passing through the at least one key projection.

7. The illuminant board according to claim 1, further comprising:
a light guide plate disposed opposite the circuit layer;
wherein the plurality of microstructures are located between the light guide plate and the substrate; and
wherein the at least one illuminant provides a luminous light inletting into the light guide plate, and a path of the luminous light is guided by the plurality of microstructures.

8. The illuminant board according to claim 7, further comprising a light-shielding layer having a light-transmissive part, wherein an orthographic projection of the light-transmissive part of the light-shielding layer is located between the at least one first main conductive wire and the at least one second main conductive wire.

9. The illuminant board according to claim 7, wherein the light guide plate is disposed above the circuit layer.

10. The illuminant board according to claim 9, wherein the at least one illuminant at least emits a light in an upward direction.

11. The illuminant board according to claim 9, further comprising a reflective layer disposed between the plurality of microstructures and the substrate.

12. The illuminant board according to claim 9, further comprising a light-shielding layer and a reflective layer disposed above the light guide plate or comprising the light-shielding layer disposed above the light guide plate but dispensing with the reflective layer.

13. The illuminant board according to claim 7, wherein the light guide plate is disposed under the circuit layer.

14. The illuminant board according to claim 13, wherein the at least one illuminant at least emits a light in a downward direction.

15. The illuminant board according to claim 13, further comprising a light-shielding layer and a reflective layer disposed under the light guide plate or comprising the reflective layer disposed under the light guide plate but dispensing with the light-shielding layer.

16. A luminous keyboard, comprising:
a bottom plate having at least one light hole;
a plurality of keycaps located above the bottom plate, wherein the plurality of keycaps move towards or away from the bottom plate when being pressed or released by an external force; and
an illuminant board disposed opposite to the bottom plate, wherein the illuminant board comprises:
a substrate defining at least one key projection;
a circuit layer disposed on the substrate, wherein the circuit layer comprises at least one first main conductive wire configured to transmit a first voltage and at least one second main conductive wire configured to transmit a second voltage lower than the first voltage;
a light guide plate disposed opposite to the circuit layer;
a plurality of microstructures located between the light guide plate and the substrate; and
at least one illuminant coupled to the circuit layer, wherein the at least one illuminant provides a luminous light inletting into the light guide plate, and a path of the luminous light is guided by the plurality of microstructures;
wherein, the at least one first main conductive wire and/or the at least one second main conductive wire extend and pass through the at least one key projection;
wherein, an orthographic projection of the at least one light hole on the bottom plate does not overlap the at least one first main conductive wire or at least one second main conductive wire passing through the at least one key projection.

17. An illuminant board, comprising:
a substrate defining at least one key projection;
a circuit layer disposed on the substrate, wherein the circuit layer comprises at least one first main conductive wire configured to transmit a first voltage and at least one second main conductive wire configured to transmit a second voltage lower than the first voltage;
a light guide plate disposed opposite to the circuit layer, wherein the light guide plate has a light guide plate hole;
a plurality of microstructures located between the light guide plate and the substrate; and
at least one illuminant coupled to the circuit layer, wherein the at least one illuminant is located in the light guide plate hole and provides a luminous light inletting into the light guide plate, and the path of the luminous light is guided by the plurality of microstructures;
wherein, the at least one first main conductive wire and/or the at least one second main conductive wire extend and pass through the at least one key projection;
wherein, an orthographic projection of the light guide plate hole is located between the at least one first main conductive wire and the at least one second main conductive wire.

* * * * *